US012741654B2

(12) United States Patent
Breddermann et al.

(10) Patent No.: US 12,741,654 B2

(45) Date of Patent: Sep. 22, 2026

(54) METHOD FOR DETERMINING A LONGITUDINAL SPEED OF A VEHICLE USING A RADAR SENSOR AND AN INSTALLATION ORIENTATION OF THE RADAR SENSOR WHEN DRIVING IN A CURVE

(71) Applicant: HELLA GmbH & Co. KGaA, Lippstadt (DE)

(72) Inventors: Tobias Breddermann, Lippstadt (DE); Ridha Farhoud, Laatzen (DE); Christopher Grimm, Lippstadt (DE); Ernst Warsitz, Paderborn (DE); Tai Fei, Hamm (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 276 days.

(21) Appl. No.: 18/114,720

(22) Filed: Feb. 27, 2023

(65) Prior Publication Data

US 2023/0219583 A1 Jul. 13, 2023

Related U.S. Application Data

(63) Continuation of application No. PCT/EP2021/072414, filed on Aug. 11, 2021.

(30) Foreign Application Priority Data

Aug. 28, 2020 (DE) ..................... 10 2020 122 543.1

(51) Int. Cl.

| | |
|---|---|
| ***B60W 40/107*** | (2012.01) |
| ***B60W 40/114*** | (2012.01) |
| ***G01S 13/88*** | (2006.01) |

(52) U.S. Cl.

CPC ........ *B60W 40/107* (2013.01); *B60W 40/114* (2013.01); *G01S 13/88* (2013.01); *B60W 2420/408* (2024.01)

(58) Field of Classification Search

CPC ............. B60W 40/107; B60W 40/114; B60W 2420/408; G01S 13/88; G01S 7/40; G01S 13/60

See application file for complete search history.

(56) References Cited

U.S. PATENT DOCUMENTS

2011/0295549 A1 12/2011 Takabayashi et al.
2016/0291143 A1* 10/2016 Cao ....................... G01S 13/874

(Continued)

FOREIGN PATENT DOCUMENTS

DE 102014223461 A1 5/2016

OTHER PUBLICATIONS

International Search Report dated Nov. 25, 2021 in corresponding application PCT/EP2021/072414.

(Continued)

*Primary Examiner* — Aniss Chad
*Assistant Examiner* — Christine Nguyen Huynh
(74) *Attorney, Agent, or Firm* — Muncy, Geissler, Olds & Lowe, P.C.

(57) ABSTRACT

A method for determining a longitudinal velocity of a vehicle using at least one radar sensor and an installation orientation of the at least one radar sensor during cornering, wherein the method comprises: determining at least one velocity vector of the at least one radar sensor during cornering of the vehicle, wherein the at least one velocity vector contains a longitudinal velocity component and a lateral velocity component of the at least one radar sensor, transmitting the at least one velocity vector to a module for estimating the longitudinal velocity of the vehicle and the (Continued)

installation orientation of the at least one radar sensor, and estimating the longitudinal velocity of the vehicle and the installation orientation of the at least one radar sensor at least on the basis of the at least one velocity vector transmitted to the module and via the module.

15 Claims, 7 Drawing Sheets

(56) References Cited

U.S. PATENT DOCUMENTS

| | | | | |
|---|---|---|---|---|
| 2016/0320482 | A1 | 11/2016 | Ling | |
| 2018/0024228 | A1 | 1/2018 | Schiffmann et al. | |
| 2018/0045811 | A1* | 2/2018 | Cao | G01S 13/50 |
| 2018/0356517 | A1* | 12/2018 | Cieslar | G01S 13/42 |
| 2020/0198650 | A1* | 6/2020 | Ribbens | G07C 5/0808 |
| 2020/0400814 | A1* | 12/2020 | Gustafsson | G01S 7/403 |

OTHER PUBLICATIONS

Grimm, Christopher et al: "Detection of Moving Targets in Automotive Radar with Distored Ego-Velocity Information" IEEE Microwaves, Radar and Remote Sensing Symposium, Aug. 29-31, 2017, pp. 111-116, DOI: 10.1109/MRRS.2017.8075040.

* cited by examiner $$z = h(x) \rightarrow H \approx \left( \frac{\delta h(x)}{\delta x} | x = \hat{x} \right) = J$$

$$= \left( \begin{bmatrix} \cos(\alpha_1) & 0 & -\cos(\alpha_1)\Delta y_1 + \sin(\alpha_1)\Delta x_1 & 0 & -\sin(\alpha_1)(v_x - \Delta y_1 \omega) + \cos(\alpha_1)(\Delta x_1 \omega) & 0 & 0 & 0 \\ -\sin(\alpha_1) & 0 & \sin(\alpha_1)\Delta y_1 + \cos(\alpha_1)\Delta x_1 & 0 & -\cos(\alpha_1)(v_x - \Delta y_1 \omega) - \sin(\alpha_1)(\Delta x_1 \omega) & 0 & 0 & 0 \\ \cos(\alpha_2) & 0 & -\cos(\alpha_2)\Delta y_2 + \sin(\alpha_2)\Delta x_2 & 0 & 0 & -\sin(\alpha_2)(v_x - \Delta y_2 \omega) + \cos(\alpha_2)(\Delta x_2 \omega) & 0 & 0 \\ -\sin(\alpha_2) & 0 & \sin(\alpha_2)\Delta y_2 + \cos(\alpha_2)\Delta x_2 & 0 & 0 & -\cos(\alpha_2)(v_x - \Delta y_2 \omega) - \sin(\alpha_2)(\Delta x_2 \omega) & 0 & 0 \\ \beta & 0 & 0 & 0 & 0 & 0 & v_x & 0 \\ 0 & 0 & \gamma & 0 & 0 & 0 & 0 & \omega \end{bmatrix} | x = \hat{x} \right)$$

Fig. 5

METHOD FOR DETERMINING A LONGITUDINAL SPEED OF A VEHICLE USING A RADAR SENSOR AND AN INSTALLATION ORIENTATION OF THE RADAR SENSOR WHEN DRIVING IN A CURVE

This nonprovisional application is a continuation of International Application No PCT/EP2021/072414, which was filed on Aug. 11, 2021, and which claims priority to German Patent Application No 10 2020 122 543.1, which was filed in Germany on Aug. 28, 2020, and which are both herein incorporated by reference.

BACKGROUND OF THE INVENTION

The scope of applications for radar sensors in the automotive industry continues to increase. In order to provide driver assistance functions such as adaptive cruise control, the warning system for detecting vehicles in blind spots when reversing, and the lane change assistant, more and more vehicles are being equipped with radar sensors as a distance, relative velocity, and angle measurement equipment for objects in the vehicle's environment. From these measurements, an understanding of the complex vehicle surroundings is generated via classification algorithms which discriminate the detected radar targets into different object types with certain behaviors.

In addition to the classical detection and localization of surrounding objects, in the future a precise classification of the different object types will also be performed by means of the radar sensors. For this classification, essential features must be abstracted from the signal shape during signal processing. A key point here is the detection of significant reflectors in the vehicle environment and their classification as moving and stationary targets. Because the latter can change their relative position to the vehicle or so-called ego vehicle, the dynamic targets require more sophisticated tracking and control measures than stationary targets.

In order to perform this classification accurately, radar systems must be geometrically or extrinsically calibrated with respect to the ego vehicle carrying the radar. It also requires precise knowledge of the state of motion of the ego vehicle (referred to as the vehicle hereafter). Insufficient knowledge about the state of motion of the vehicle leads directly to a worsening of the classification accuracy.

The estimation of the longitudinal velocity or intrinsic velocity of the vehicle or ego vehicle during longitudinal vehicle motion is known from Grimm, C., Farhound, R., Fei, T., Warsitz, E., Breddermann, T., and Häb-Umbach, R., "Detection of moving targets in automotive radar with distorted ego-velocity information," in Proceeding of the MICROWAVES, RADAR AND REMOTE SENSING SYMPOSIUM (MRRS), 2017. In the algorithm used there, the significant reflectors detected are used to estimate therefrom the relative longitudinal ego-motion of the vehicle and thus to significantly improve the classification of the targets. This method is limited to longitudinal vehicle movements.

SUMMARY OF THE INVENTION

It is therefore an object of the present invention to provide a method for determining the longitudinal velocity of the vehicle with radar sensors, in particular to enable a particularly more accurate classification of the various objects detected by radar sensors.

In an exemplary embodiment, the preceding object is achieved by a method for determining a vehicle using a radar sensor and an installation orientation of the radar sensor during cornering, a radar system, and a motor vehicle. In this regard, features and details that are described in relation to the method of the invention also apply, of course, in relation to the radar system of the invention and to the vehicle of the invention, and conversely in each case, so that with regard to the disclosure, reference is or can always be made mutually to the individual aspects of the invention.

According to an example of the invention, the object is accordingly achieved by a method for determining a longitudinal velocity of a vehicle using at least one radar sensor and an installation orientation of the at least one radar sensor during cornering, wherein the method comprises the steps of: determining at least one velocity vector of the at least one radar sensor during cornering of the vehicle, wherein the at least one velocity vector contains a longitudinal velocity component and a lateral velocity component of the at least one radar sensor; transmitting the at least one velocity vector to a module for estimating the longitudinal velocity of the vehicle and the installation orientation of the at least one radar sensor; and estimating the longitudinal velocity of the vehicle and the installation orientation of the at least one radar sensor at least on the basis of the at least one velocity vector transmitted to the module and by means of the module.

The aforementioned object is thus achieved, on the one hand, by the method being set up to determine the longitudinal velocity of the vehicle during cornering. And, on the other hand, the aforementioned object is achieved in that, in addition to the estimation of the longitudinal velocity of the vehicle, the installation orientation of the at least one radar sensor or the installation orientations of the radar sensors are also estimated and thus determined. This allows accurate determination of the vehicle's longitudinal velocity even when the vehicle is cornering, as well as avoiding measurement errors caused by incorrectly or imprecisely parameterized or detected installation orientations. It can be provided further that the longitudinal acceleration of the vehicle is also estimated using the longitudinal velocity of the vehicle and the installation orientation of the at least one radar sensor.

Of course, in the method of the invention, multiple velocity vectors can be determined and transmitted to the module to determine the estimate on the basis of the determined multiple velocity vectors. Finally, the estimation by means of the module can settle down with increasing velocity vectors or measured values, therefore, with an increasing time of measurement of the at least one radar sensor, and thus can make particularly unbiased estimates.

It can be provided that at least one velocity vector of each of at least two radar sensors is determined during cornering, the velocity vectors of the at least two radar sensors are transmitted to the module, and the estimation of the longitudinal velocity of the vehicle and each installation orientation of the at least two radar sensors is performed on the basis of the transmitted velocity vectors of the at least two radar sensors. For example, instead of two radar sensors, three, four, or more radar sensors can be used to determine the velocity vector. Each radar sensor then provides a longitudinal velocity component and a lateral velocity component. Accordingly, the longitudinal velocity of the vehicle can be estimated even more accurately and the installation orientation of each of the radar sensors can also be estimated.

Further, it can be provided that the estimation of the longitudinal velocity of the vehicle and the installation orientation of the at least one radar sensor is performed simultaneously. This has the advantage that both estimated values can be provided simultaneously by means of only one common estimation procedure or by one common module. The longitudinal acceleration of the vehicle can also be estimated simultaneously with the longitudinal velocity of the vehicle and the installation orientation of the at least one radar sensor.

It can also be provided that the module is executed in the at least one radar sensor or a central processing unit of the vehicle. The central processing unit can be part of a radar system comprising the at least one sensor and the module. The module can be stored as a program or algorithm in the at least one radar sensor, in one of multiple radar sensors, or in the central processing unit and executed there.

Finally, it can also be provided that the at least one velocity vector of the at least one radar sensor is determined on the basis of a relative velocity of the at least one radar sensor, a sideslip angle of the vehicle, a horizontal incidence angle of the at least one radar sensor, and a vertical incidence angle of the at least one radar sensor. The relative velocity of the at least one radar sensor is measured as a radial velocity. It can allow determination of the longitudinal velocity component and the lateral velocity component of the velocity vector with appropriate measurement or knowledge of the vehicle's sideslip angle, the horizontal incidence angle of the at least one radar sensor, and the vertical incidence angle of the at least one radar sensor. The following equation depicts this relationship:

$$v_r = -v_x\cos(\varphi-\delta)\cos(\varepsilon) - v_y\sin(\varphi-\delta)\cos(\varepsilon).$$

Here, $v_r$ is the relative velocity of the radar sensor, $v_x$ is the longitudinal velocity component in the direction of the vehicle's longitudinal axis, $v_y$ is the lateral velocity component that is orthogonal to the longitudinal velocity component, $\varphi$ is the horizontal incidence angle, $\varepsilon$ is the vertical incidence angle, and $\delta$ is the sideslip angle. The sideslip angle is formed during so-called drifting, which describes a driving behavior of the vehicle unstable in terms of direction. The sideslip angle is the angle between the motion of the vehicle at its center of gravity and its longitudinal axis.

It can also be provided that further at least one inaccurate longitudinal velocity of the vehicle is determined by an odometry sensor of the vehicle and is transmitted to the module, wherein further at least one scaling factor for the transmitted inaccurate longitudinal velocity of the vehicle is estimated simultaneously with the longitudinal velocity of the vehicle and the installation orientation of the at least one radar sensor. The longitudinal velocity measured or provided by the odometry sensor is inaccurate to the extent that it has an inaccuracy or measurement error relative to the actual longitudinal velocity. This measurement error can be detected by the method in the form of the estimated scaling factor. The scaling factor can correct the measurement error. This can be done by multiplying the inaccurate longitudinal velocity by the estimated scaling factor.

In addition, it can be provided that further at least one yaw rate sensor of the vehicle determines at least one inaccurate yaw rate of the vehicle, which is transmitted to the module, wherein further at least one scaling factor for the inaccurate yaw rate of the vehicle is estimated simultaneously with the longitudinal velocity of the vehicle and the installation orientation of the at least one radar sensor. The yaw rate or yaw velocity measured or provided by the yaw rate sensor is inaccurate to the extent that it has an inaccuracy or measurement error relative to the actual yaw rate. This measurement error can be detected by the method in the form of the estimated scaling factor. The scaling factor can correct the measurement error. This can be done by multiplying the inaccurate yaw rate by the estimated scaling factor.

It can be provided furthermore that further a yaw rate of the vehicle is estimated simultaneously with the longitudinal velocity of the vehicle and the installation orientation of the at least one radar sensor. Thus, another accurate measurement parameter can be determined by means of the module based on the measurements of the at least one radar sensor. It can also be provided that the yaw acceleration is determined simultaneously with the other parameters.

In addition, it can be provided that the installation orientation of the at least one radar sensor is determined by estimating a difference between a parameterized installation angle and a true installation angle.

It can also be provided that the module is a Kalman filter. It has been shown that this produces a particularly unbiased estimate of the longitudinal velocity of the vehicle and the installation orientation of the at least one radar sensor.

It can further be provided that a measurement vector with the longitudinal velocity component and the lateral velocity component of the at least one radar sensor is combined with a state vector to be estimated with the longitudinal velocity of the vehicle and the installation orientation of the at least one radar sensor in the module to form a state-to-measurement equation.

Here it can be provided that in the module a state-to-measurement matrix is formed from the state-to-measurement equation, and the longitudinal velocity of the vehicle and the installation orientation of the at least one radar sensor are estimated by the module by means of the state-to-measurement matrix.

According to a second aspect of the invention, the aforementioned object is achieved further by a radar system for a vehicle, wherein the radar system has at least one radar sensor and at least one module, wherein the radar system is set up to perform the method according to the first aspect of the invention.

Accordingly, the radar system can have multiple radar sensors, for example, two, three, four, or more radar sensors.

It can be provided that the at least one radar sensor is connected to the module by means of a proprietary or open data channel, in particular a CAN bus. Accordingly, the transmission of the at least one velocity vector to the module can be done by means of a proprietary or open data channel, in particular a CAN bus.

According to a third aspect of the invention, the aforementioned object is achieved additionally by a vehicle having a radar system according to the second aspect of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 is a state-to-measurement matrix;

DETAILED DESCRIPTION

Figure 1:
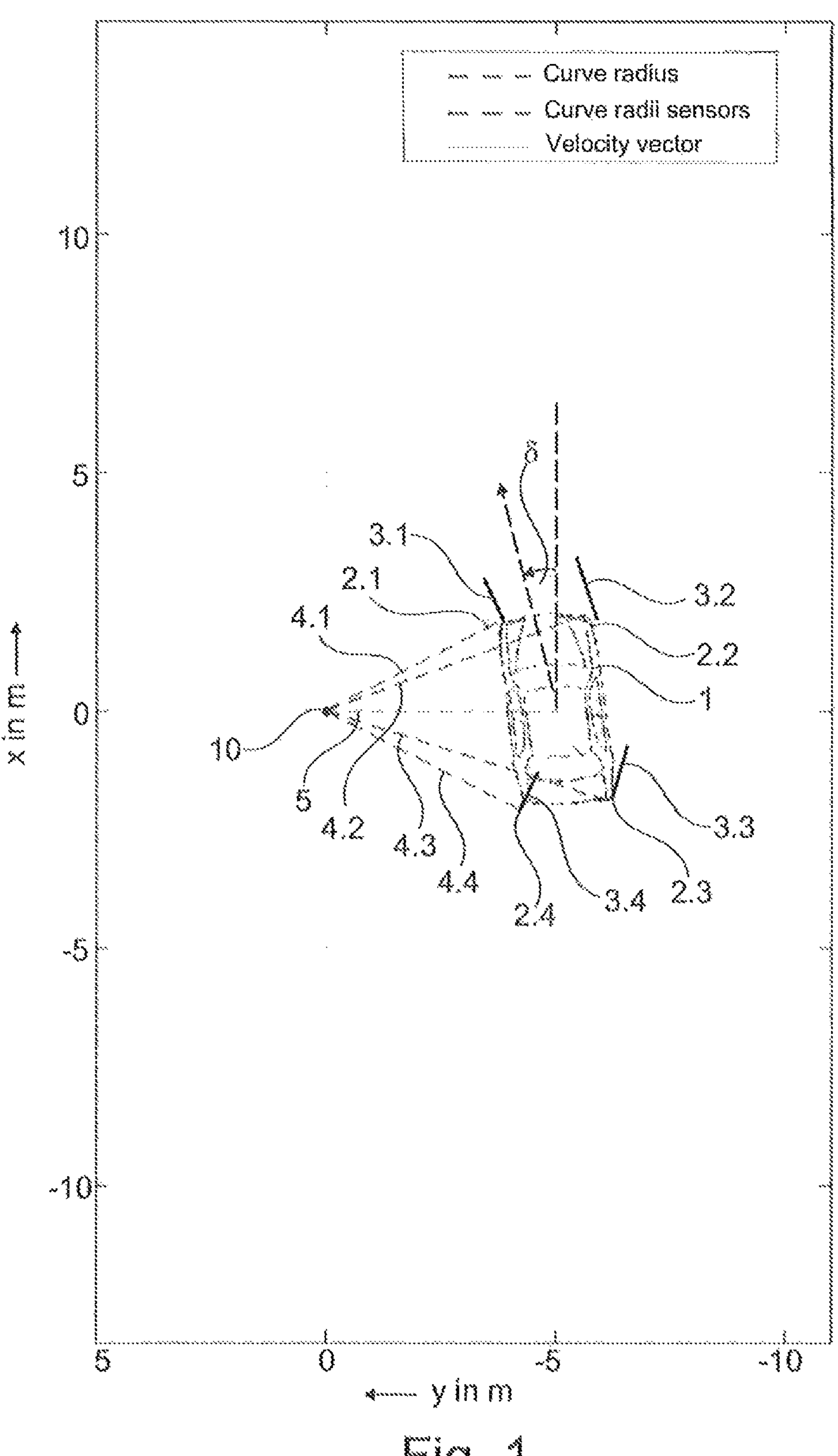
FIG. 1 is a vehicle according to an exemplary embodiment of the invention during cornering.

FIG. 1 shows a vehicle 1 according to an exemplary embodiment of the invention during cornering. Vehicle 1 is shown in a Cartesian x-y coordinate system.

Vehicle 1 has four radar sensors 2.1, 2.2, 2.3, 2.4. Alternatively, it can also have only one, two, three, or more than four radar sensors 2. Each of the radar sensors 2.1, 2.2, 2.3, 2.4 experiences a velocity v, which can be represented as a vector. The velocity vector $\vec{v}$ has a longitudinal velocity component $v_{sensor,x}$, a lateral velocity component $v_{sensor,y}$, and a vertical velocity component $v_{sensor,z}$. The velocity vector $\vec{v}$ of each radar sensor 2.1, 2.2, 2.3, 2.4 thus takes the form $$\vec{v} = \begin{bmatrix} v_{sensor,x} \\ v_{sensor,y} \\ v_{sensor,z} \end{bmatrix},$$

where it is assumed hereinafter that $v_{sensor,z}=0$.

The depicted velocity vectors $\vec{v}$ of radar sensors 2.1, 2.2, 2.3, 2.4 are labeled with 3.1, 3.2, 3.3, 3.4 here. Due to the different installation position of radar sensors 2.1, 2.2, 2.3, 2.4 on vehicle 1, radar sensors 2.1, 2.2, 2.3, 2.4 pass through a different radius during cornering with respect to an object or reflector 10, which radar sensors 2.1, 2.2, 2.3, 2.4 perceive as a point target. Accordingly, the velocity vectors 3.1, 3.2, 3.3, 3.4 differ from one another. The curve radii 4.1, 4.2, 4.3, 4.4 of radar sensors 2.1, 2.2, 2.3, 2.4 and curve radius 5 of vehicle 1 are drawn accordingly. Also, a sideslip angle δ of vehicle 1 as the angle enclosed between the longitudinal axis of vehicle 1 and the direction of movement of vehicle 1 during cornering is marked accordingly in FIG. 1.

Whereas, on the one hand, the longitudinal velocity $v_x$ of vehicle 1 is determined by the most accurate possible estimate using the method presented here, the installation orientation of radar sensors 2.1, 2.2, 2.3, 2.4 can also be determined simultaneously by an accurate estimate. The installation orientation is estimated here as an alignment error from a parameterized installation orientation or position.

Figure 2:
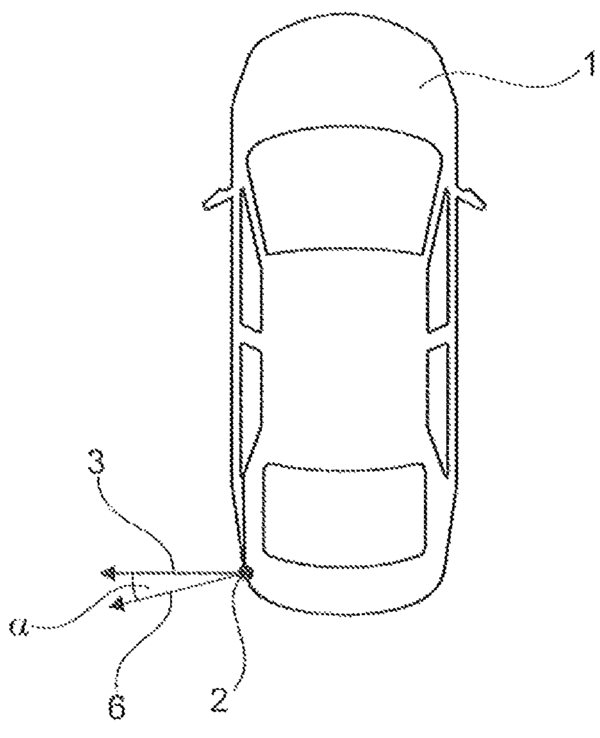
FIG. 2 is a vehicle with a difference between a parameterized installation angle and a true installation angle.

The alignment error is shown in FIG. 2 as the misalignment angle α between velocity vector 3 of radar sensor 2 as measured by radar sensor 2 and the true velocity vector 6. The true velocity vector 6 can also be referred to as the ground truth velocity vector $\vec{v}$.

Figure 3:
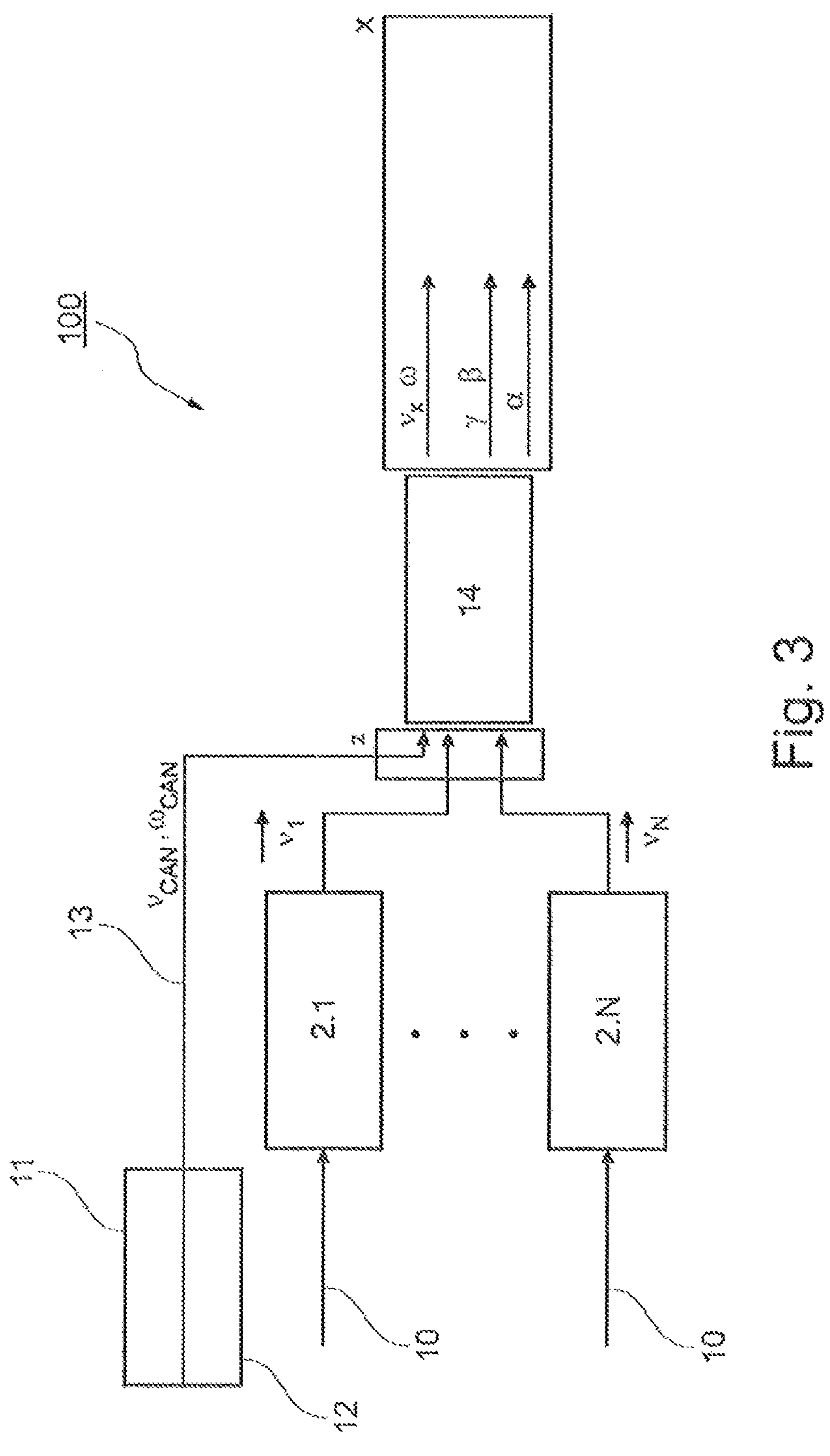
FIG. 3 is a radar system according to an exemplary embodiment for the vehicles in FIGS. 1 and 2.

FIG. 3 now shows a radar system 100 for one of the vehicles 1 from FIGS. 1 and 2 according to an exemplary embodiment of the invention with one or more radar sensors 2.1 . . . 2.N, whose velocity vectors $\vec{v}_1 \ldots \vec{v}_N$ are evaluated in a module 14, in this case, in the form of a Kalman filter. In this regard, module 14 can be executed on a computing unit of radar system 100. In the following it shall be assumed that N=2; therefore, two radar sensors 2.1, 2.2 are evaluated.

Radar sensors 2.1, 2.2 detect one or more reflectors when vehicle 1 is cornering. Radar sensors 2.1, 2.2 independently determine the velocity vectors $\vec{v}_1$, $\vec{v}_2$ from this using a sensor velocity determination. The relative velocity $v_r$, which is measured by radar sensors 2.1, 2.2, is used for the sensor velocity determination. This is a radial velocity. It can be represented as follows with the aid of the sideslip angle δ of vehicle 1, a horizontal incidence angle φ of radar sensors 2.1, 2.2, and a vertical incidence angle ε of radar sensors 2.1, 2.2 for each of radar sensors 2.1, 2.2:

$$v_r = -v_x\cos(\varphi-\delta)\cos(\varepsilon) - v_y\sin(\varphi-\delta)\cos(\varepsilon).$$

Here, $v_x$, is the longitudinal velocity component of the respective radar sensor 2.1, 2.2 in the direction of the longitudinal vehicle axis of vehicle 1 and $v_y$ is the lateral velocity component of the respective radar sensor 2.1, 2.2, as has already been explained above.

Figure 4:
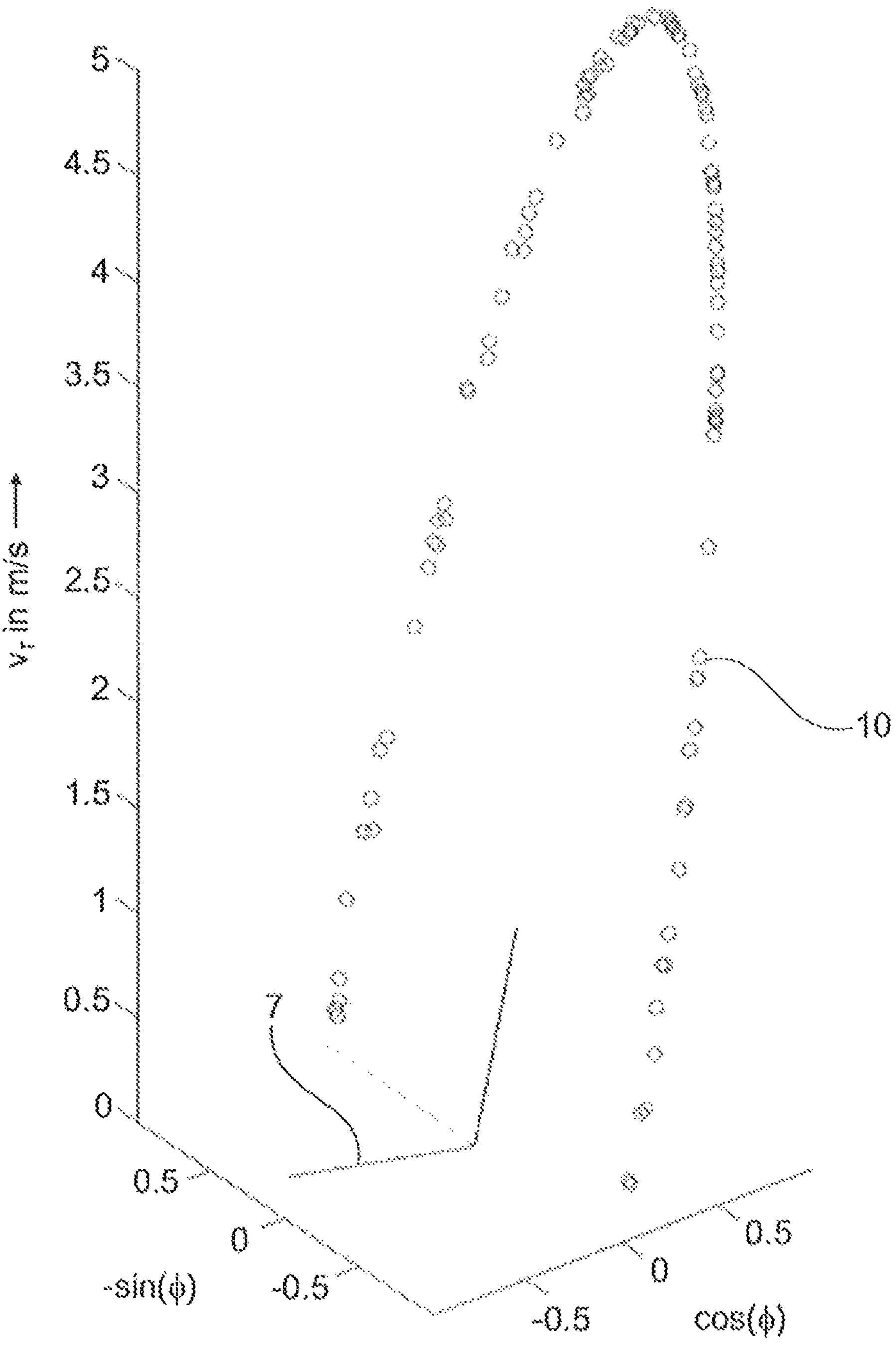
FIG. 4 is a measurement of a radar sensor of the radar system in FIG. 3.
Figures 6A, 6B, 6C, 6D:
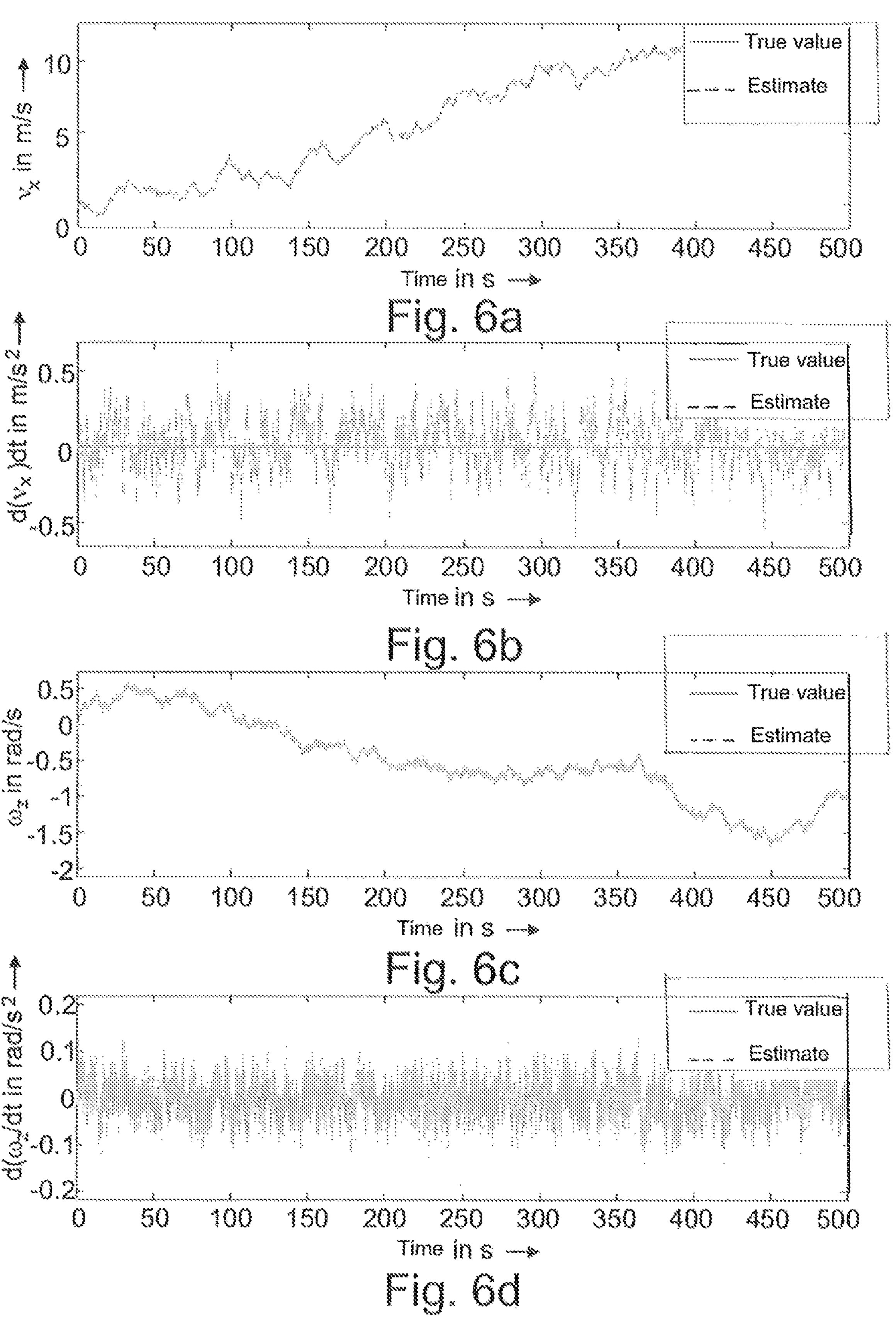
FIGS. 6*a*-6*d* are diagrams with parameters estimated using the radar system in FIG. 3 and true parameters.
Figures 7A, 7B, 7C, 7D:
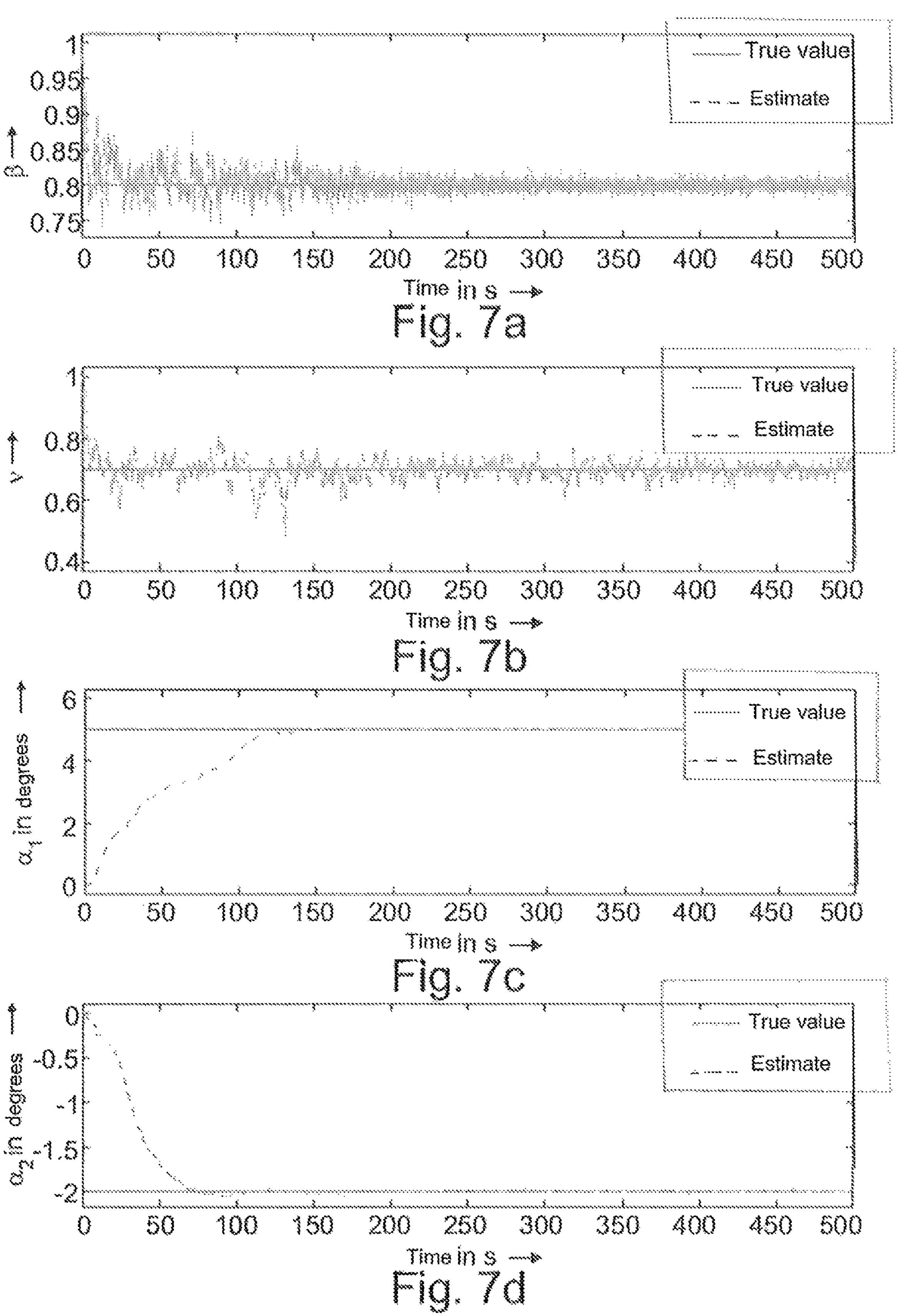
FIGS. 7*a*-7*d* are further diagrams with parameters estimated using the radar system in FIG. 3 and true parameters.

FIG. 4 shows by of example the measurement results of the relative velocity $v_r$ of one of the two radar sensors 2.1, 2.2 for various stationary reflectors or targets 10. To determine the velocity vector $\vec{v}$, the normal vector 7 to the plane spanned by the stationary targets 10 is calculated and differentiated in the direction of the coordinates cos φ and −sin φ. The negative reciprocal gradient now gives the estimated longitudinal velocity component $v_x$ and the estimated lateral velocity component $v_y$ of the respective radar sensor 2.1, 2.2.

The determined velocity vector $\vec{v}$ of each of the radar sensors 2.1, 2.2 can thereby be modeled by the relationship $\vec{v}=\vec{w}\times\vec{R}+\overrightarrow{v_{trans}}$, where $\vec{w}$ is the rotational velocity vector with $$\vec{w} = \begin{bmatrix} 0 \\ 0 \\ w \end{bmatrix},$$

$\vec{R}$ is a position vector from the vehicle rear axle to the parameterized position of the respective radar sensor 2.1, 2.2 which has been parameterized beforehand, and $\overrightarrow{v_{trans}}$ is a velocity vector of vehicle 1 measured at its rear axle. Thus, knowledge of the velocity vector $\vec{v}$ of each of the radar sensors 2.1, 2.2 and the position vector $\vec{R}$ allows determination of the yaw rate or yaw velocity w and the longitudinal velocity or longitudinal vehicle velocity $v_x$ of vehicle 1.

In this regard, the determined velocity vector $\vec{v}$ of each of the radar sensors 2.1, 2.2 can be transmitted to radar sensors 2.1, 2.2 among each other by inter-sensor communication. In particular, however, these are transmitted to module 14. An open or proprietary data channel, in particular the CAN bus 13, can be used for this purpose. Further, an odometry sensor 11 and a yaw rate sensor 12 transmit via CAN bus 13 an inaccurate longitudinal velocity $v_{CAN}$ and an inaccurate yaw rate $w_{CAN}$, which are inaccurate in the sense that they do not correspond to ground truth or are true, but are beset with measurement errors.

In module 14, the measured values transmitted to it are combined into a measurement vector z, which can be represented as $$z = \begin{bmatrix} v_{x1} \\ v_{y1} \\ v_{x2} \\ v_{y2} \\ v_{CAN} \\ w_{CAN} \end{bmatrix}.$$

The velocity components $v_{x1}$, $v_{x2}$, $v_{y2}$ here are lateral velocity components and longitudinal velocity components of the two radar sensors 2.1, 2.2.

The result sought is a state vector to be estimated x, which is estimated and output by module 14. This state vector can be represented as $$x = \begin{bmatrix} v_x \\ \dot{v}_x \\ w \\ \dot{w} \\ \alpha_1 \\ \alpha_2 \\ \beta \\ \gamma \end{bmatrix},$$

where $v_x$ indicates the longitudinal velocity of vehicle 1, $\dot{v}_x$ indicates the longitudinal acceleration of vehicle 1, w indicates the yaw velocity or yaw rate of vehicle 1, $\dot{w}$ indicates the yaw acceleration of vehicle 1, $\alpha_1$, $\alpha_2$ indicate the misalignment angles of radar sensors 2.1, 2.2, $\beta$ is a scaling factor or correction factor for the inaccurate longitudinal velocity $v_{CAN}$, and $\gamma$ is a scaling factor or correction factor for an inaccurate yaw rate $w_{CAN}$.

If radar sensors 2.1, 2.2 are mounted rotated in vehicle 1 due to tolerances, the velocity vector $\vec{v}$ is rotated in the same way. The measured sensor velocity $$\begin{bmatrix} v_{x1} \\ v_{y1} \end{bmatrix} = \begin{bmatrix} \cos(\alpha_1) & \sin(\alpha_1) \\ -\sin(\alpha_1) & \cos(\alpha_1) \end{bmatrix} \begin{bmatrix} v_x @ Sensor2.1 \\ v_y @ Sensor2.1 \end{bmatrix}$$

then corresponds to the rotated velocity $$\begin{bmatrix} v_x @ Sensor2.1 \\ v_y @ Sensor2.1 \end{bmatrix}$$

of vehicle 1 and can be summarized in a state-to-measurement equation h(x) as follows:

$$z = \begin{bmatrix} v_{x1} \\ v_{y1} \\ v_{x2} \\ v_{y2} \\ v_{CAN} \\ w_{CAN} \end{bmatrix} = h(x) = \begin{bmatrix} \cos(\alpha_1)(v_x - \Delta y_1 \omega) + \sin(\alpha_1)(\Delta x_1 \omega) \\ -\sin(\alpha_1)(v_x - \Delta y_1 \omega) + \cos(\alpha_1)(\Delta x_1 \omega) \\ \cos(\alpha_2)(v_x - \Delta y_2 \omega) + \sin(\alpha_2)(\Delta x_2 \omega) \\ -\sin(\alpha_2)(v_x - \Delta y_2 \omega) + \cos(\alpha_2)(\Delta x_2 \omega) \\ \beta v_x \\ \gamma \omega \end{bmatrix}.$$

Accordingly, the state-to-measurement matrix shown in FIG. 5 is obtained, the solution of which leads to the sought state vector x to be estimated.

FIGS. 6*a* through 6*d* and FIGS. 7*a* through 7*d* show, for the various parameters to be estimated, the result of the estimate, therefore, the estimated value, versus the ground truth, therefore, the true value. According to FIGS. 6*a* to 6*d*, it can be seen that the motion states were estimated for the entire time duration in an unbiased manner. According to FIGS. 7*a* to 7*d*, it can be seen that the mechanical system states after the Kalman filter has settled were also estimated in an unbiased manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to determine a longitudinal velocity of a vehicle using at least one radar sensor and an installation orientation of the at least one radar sensor during cornering of the vehicle, the at least one radar sensor being mounted on the vehicle, and the cornering of the vehicle being when the vehicle is driving in a curve, the method comprising:

determining, via the at least one radar sensor that is mounted on the vehicle, at least one velocity vector of the at least one radar sensor during cornering of the vehicle with respect to an object detected by the at least one radar sensor, the at least one velocity vector having a longitudinal velocity component and a lateral velocity component of the at least one radar sensor;

transmitting the at least one velocity vector to a module to estimate the longitudinal velocity of the vehicle and the installation orientation of the at least one radar sensor; and estimating, via the module, the longitudinal velocity of the vehicle and the installation orientation of the at least one radar sensor at least based on the at least one velocity vector transmitted to the module, the longitudinal velocity of the vehicle and the installation orientation of the at least one radar sensor that have been estimated being used to classify the object detected by the at least one radar sensor, wherein the module is a computer program stored on a non-transitory computer readable medium in the at least one radar sensor or a central processing unit of the vehicle to be executed by the at least one radar sensor or the central processing unit.

2. The method according to claim 1, wherein at least one velocity vector of each of at least two radar sensors is determined during cornering, the velocity vectors of the at least two radar sensors are transmitted to the module, and the estimation of the longitudinal velocity of the vehicle and each installation orientation of the at least two radar sensors is performed based on the transmitted velocity vectors of the at least two radar sensors.

3. The method according to claim 1, wherein the estimation of the longitudinal velocity of the vehicle and the installation orientation of the at least one radar sensor is performed substantially simultaneously.

4. The method according to claim 1, wherein the at least one velocity vector of the at least one radar sensor is determined based on a yaw rate of the at least one radar sensor, a sideslip angle of the vehicle, a horizontal incidence angle of the at least one radar sensor, and/or a vertical incidence angle of the at least one radar sensor.

5. The method according to claim 1, wherein at least one inaccurate longitudinal velocity of the vehicle is determined by an odometry sensor of the vehicle and is transmitted to the module, wherein at least one scaling factor for the transmitted inaccurate longitudinal velocity of the vehicle is estimated substantially simultaneously with the longitudinal velocity of the vehicle and the installation orientation of the at least one radar sensor, and wherein the at least one scaling factor is a correction factor.

6. The method according to claim 1, wherein at least one yaw rate sensor of the vehicle determines at least one inaccurate yaw rate of the vehicle, which is transmitted to the module, and wherein at least one scaling factor for the inaccurate yaw rate of the vehicle is estimated substantially simultaneously with the longitudinal velocity of the vehicle and the installation orientation of the at least one radar sensor, and wherein the at least one scaling factor is a correction factor.

7. The method according to claim 1, wherein a yaw rate of the vehicle is estimated substantially simultaneously with the longitudinal velocity of the vehicle and the installation orientation of the at least one radar sensor.

8. The method according to claim 1, wherein the installation orientation of the at least one radar sensor is determined by estimating a difference between a parameterized installation angle and a true installation angle.

9. The method according to claim 1, wherein the module is a Kalman filter.

10. The method according to claim 1, wherein a measurement vector with the longitudinal velocity component and the lateral velocity component of the at least one radar sensor is combined with a state vector to be estimated with the longitudinal velocity of the vehicle and the installation orientation of the at least one radar sensor in the module to form a state-to-measurement equation.

11. The method according to claim 10, wherein, in the module, a state to measurement matrix is formed from the state-to-measurement equation, and the longitudinal velocity of the vehicle and the installation orientation of the at least one radar sensor are estimated by the module by the state-to-measurement matrix.

12. A radar system for a vehicle comprising:

a central processing unit;

at least one radar sensor mounted on the vehicle; and at least one module, the at least one module being a computer program stored on a non-transitory computer readable medium in the at least one radar sensor or the central processing unit that is to be executed by the at least one radar sensor or the central processing unit, wherein the radar system is set up to perform the method according to claim 1.

13. The radar system according to claim 12, wherein the at least one radar sensor is connected to the module by a proprietary or open data channel, or a CAN bus.

14. A vehicle comprising the radar system according to claim 12.

15. The method according to claim 1, wherein the at least one velocity vector of the at least one radar sensor is determined based on a sideslip angle of the vehicle.

* * * * *